U S010771522B2

United States Patent
Asnis et al.

(10) Patent No.: US 10,771,522 B2
(45) Date of Patent: Sep. 8, 2020

(54) CROWDSOURCED PREDICTION OF CDN PERFORMANCE FOR ZERO BUFFER DELIVERY OF CONTENT

(71) Applicant: Roku, Inc., Los Gatos, CA (US)

(72) Inventors: Ilya Asnis, San Jose, CA (US); Wim Michiels, Los Gatos, CA (US)

(73) Assignee: Roku, Inc., Los Gatos, CA (US)

( * ) Notice: Subject to any disclaimer, the term of this patent is extended or adjusted under 35 U.S.C. 154(b) by 35 days.

(21) Appl. No.: 15/961,054

(22) Filed: Apr. 24, 2018

(65) Prior Publication Data

US 2019/0327281 A1    Oct. 24, 2019

(51) Int. Cl.
    *G06F 15/16*      (2006.01)
    *H04L 29/06*      (2006.01)
    *H04L 29/08*      (2006.01)

(52) U.S. Cl.
    CPC .......... *H04L 65/4084* (2013.01); *H04L 67/10* (2013.01); *H04L 67/18* (2013.01); *H04L 67/22* (2013.01)

(58) Field of Classification Search
    CPC . H04L 65/1089; H04L 65/4084; H04L 67/22; H04L 67/10; H04L 67/18; H04L 65/605
    See application file for complete search history.

(56) References Cited

U.S. PATENT DOCUMENTS

| | | | | |
|---|---|---|---|---|
| 9,246,965 | B1 * | 1/2016 | Stoica | H04L 65/80 |
| 9,361,353 | B1 * | 6/2016 | Aristides | G06F 16/735 |
| 9,613,042 | B1 * | 4/2017 | Joseph | G06F 16/16 |
| 10,182,096 | B1 * | 1/2019 | Siddiqi | H04L 65/608 |
| 2008/0189735 | A1 * | 8/2008 | Barton | G11B 27/036 725/32 |

(Continued)

OTHER PUBLICATIONS

International Search Report and Written Opinion of the International Searching Authority directed to related International Patent Application No. PCT/US2019/028892, dated Sep. 25, 2019; 9 pages.

*Primary Examiner* — Cheikh T Ndiaye
(74) *Attorney, Agent, or Firm* — Sterne, Kessler, Goldstein & Fox P.L.L.C.

(57) ABSTRACT

Disclosed herein system, apparatus, article of manufacture, method and/or computer program product embodiments, and/or combinations and sub-combinations thereof, for using technology in innovative ways to automatically and intelligently predict performance of content delivery networks (CDNs) in a crowdsourced manner in order to deliver the highest resolution content possible with little or no buffering. In some embodiments, a media device downloads and displays primary content on a display device. The media device determines that secondary content should be stitched into the display of the primary content. Accordingly, the media device requests that a crowdsource server determine a bit-rate variant of the secondary content to download. The crowdsource server determines the bit-rate variant in a crowdsourced manner such that subsequent download of the identified bit-rate variant by the media device results in a zero buffer experience. The media device downloads the determined bit-rate variant of the secondary content, and stitches the downloaded bit-rate variant of the secondary content into the display of the primary content.

18 Claims, 8 Drawing Sheets

(56) References Cited

U.S. PATENT DOCUMENTS

| | | |
|---|---|---|
| 2009/0328124 A1 | 12/2009 | Khouzam et al. |
| 2010/0023579 A1* | 1/2010 | Chapweske ........ H04N 7/17336 709/203 |
| 2010/0094878 A1* | 4/2010 | Soroca ................... G06Q 30/02 707/748 |
| 2011/0258049 A1* | 10/2011 | Ramer ................... G06Q 30/02 705/14.66 |
| 2012/0198492 A1* | 8/2012 | Dhruv .............. H04N 21/23424 725/32 |
| 2012/0278619 A1 | 11/2012 | Tam |
| 2013/0142499 A1 | 6/2013 | Major et al. |
| 2014/0040496 A1 | 2/2014 | Moorthy et al. |
| 2014/0215085 A1* | 7/2014 | Li ....................... H04L 65/4084 709/231 |
| 2014/0279852 A1* | 9/2014 | Chen ....................... G06F 16/43 707/609 |
| 2015/0180924 A1 | 6/2015 | O'Callaghan |
| 2015/0269200 A1* | 9/2015 | Beckhardt ............... G06F 16/68 707/792 |

\* cited by examiner

CROWDSOURCED PREDICTION OF CDN PERFORMANCE FOR ZERO BUFFER DELIVERY OF CONTENT

BACKGROUND

Field

This disclosure is generally directed to delivering content in a content delivery network (CDN), and more particularly to predicting CDN performance in a crowdsourced manner in order to deliver content with little or no buffering.

Background

In streaming media applications, adaptive bitrate streaming is a technique for adjusting the quality of a movie being delivered over a network based on conditions of the network. For example, if the network is slow, a lower quality version (that is, a lower bit rate version) of the movie is delivered, to reduce buffering. Similarly, if the network is fast, a higher quality version (that is, a higher bit rate version) of the movie can be delivered.

Typically, when starting to stream a movie, the lowest quality version is selected for streaming. This conservative approach is necessary to avoid buffering, particularly when content is distributed over content delivery networks (CDNs) where conditions and performance may vary among the CDNs. But, this conservative approach needlessly results in a poor user viewing experience when current conditions of the network could support a higher bit rate stream.

SUMMARY

Provided herein are system, apparatus, article of manufacture, method and/or computer program product embodiments, and/or combinations and sub-combinations thereof, for using technology in innovative ways to automatically and intelligently predict performance of content delivery networks (CDNs) in a crowdsourced manner in order to deliver the highest resolution content possible with little or no buffering.

In some embodiments, a media device downloads and displays primary content on a display device. The media device determines that secondary content should be stitched into the display of the primary content. Accordingly, the media device requests that a crowdsource server determine a bit-rate variant of the secondary content to download. The crowdsource server determines the bit-rate variant in a crowdsourced manner such that subsequent download of the identified bit-rate variant by the media device results in a zero buffer experience. The media device downloads the determined bit-rate variant of the secondary content, and stitches the downloaded bit-rate variant of the secondary content into the display of the primary content.

In some embodiments, the media device also transfers to the crowdsource server information relating to the download of the determined bit-rate variant of the secondary content. The information comprises any combination of: information identifying an internet service provider used for the download; the geographical location of the media device; the secondary content and the determined bit-rate variant; the content server and content delivery network that the determined bit-rate variant was downloaded from; performance characteristics of the download; performance characteristics of a WIFI local to the media device; and the amount of buffering at the media device caused by or related to the download.

Another embodiment is directed to a method that operates in a crowdsource server. The method operates by receiving, from a media device, a request to identify a bit-rate variant of secondary content to stitch into a stream of primary content; accessing information relating to previous downloads of the secondary content that are relevant to at least one of the media device and the secondary content, where the information was provided to the crowdsource server by a multitude of media devices in a crowdsourced manner; generating a recommendation for a bit-rate variant of the secondary content to download by the media device, based on the accessed information; and providing the recommendation to the media device; wherein the media device downloads the recommended bit-rate variant of the secondary content, and stitches the downloaded bit-rate variant of the secondary content into the stream of the primary content.

Another embodiment is directed to a tangible computer-readable device having instructions stored thereon that, when executed by at least one computing device, cause the at least one computing device to perform operations comprising receiving, from a media device, a request to identify a bit-rate variant of secondary content to stitch into a stream of primary content; accessing information relating to previous downloads of the secondary content that are relevant to at least one of the media device and the secondary content, wherein the information was provided to the crowdsource server by a multitude of media devices in a crowdsourced manner; generating a recommendation for a bit-rate variant of the secondary content to download by the media device, based on the accessed information; and providing the recommendation to the media device; wherein the media device downloads the recommended bit-rate variant of the secondary content, and stitches the downloaded bit-rate variant of the secondary content into the stream of the primary content.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
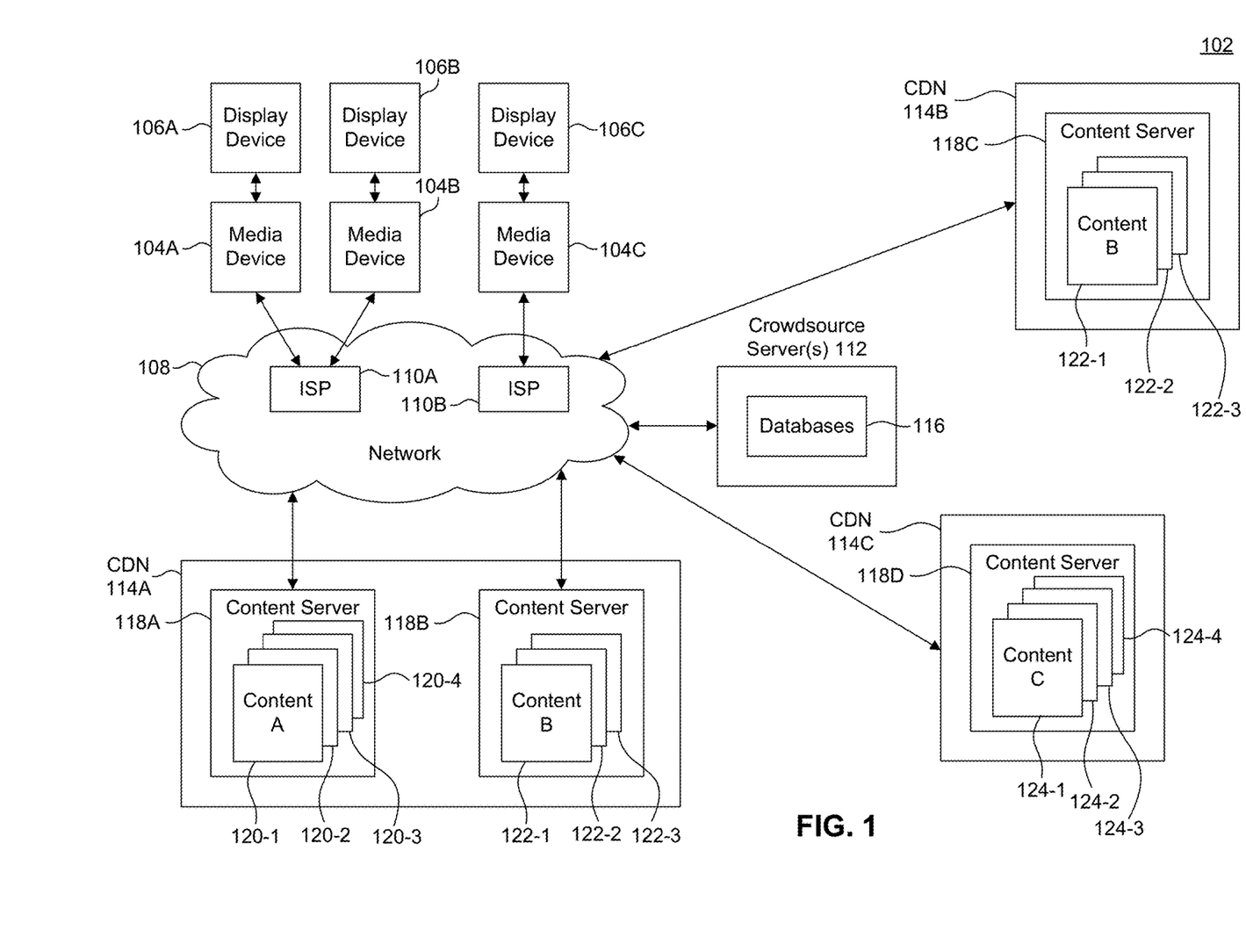
FIG. 1 illustrates a block diagram of a multimedia environment that includes a plurality of media devices receiving content via a plurality of content delivery networks, according to some embodiments.

FIG. 1 illustrates a block diagram of a multimedia environment 102, according to some embodiments. In a non-limiting example, multimedia environment 102 is directed to streaming media.

The multimedia environment 102 may include one or more media devices 104 each coupled to a display device 106. Media device 104 may be a streaming media device, DVD device, audio/video playback device, cable box, and/or digital video recording device, to name just a few examples. Display device 106 may be a monitor, television, computer, smart phone, tablet, wearable (such as a watch), and/or projector, to name just a few examples. In some embodiments, each media device 104 can be a part of, integrated with, operatively coupled to, and/or connected to its respective display device 106.

Each media device 104 may be configured to communicate with network 108 via internet service providers (ISPs) 110. Depending on their respective geographical locations, some media devices 104 may communicate with the network 108 via the same ISP 110. For example, in the non-limiting scenario of FIG. 1, media devices 104A and 104B are located relatively close to each other so they communicate with network 108 using the same ISP 110A.

In various embodiments, the network 108 can include, without limitation, wired and/or wireless intranet, extranet, Internet, cellular, Bluetooth and/or any other short range, long range, local, regional, global communications network, as well as any combination thereof.

The network 108 can include and/or operate with a plurality of content distributed networks (CDNs) 114. (For purposes of illustration, CDNs 114 are shown as distinct from the network 108 in FIG. 1, but in some embodiments may be considered to be part of network 108). Generally, a CDN 114 is a geographically distributed network of data centers for providing high availability and high performance distribution of data, documents, content, media, objects, applications, software, etc., to end-users.

In the example of FIG. 1, each CDN 114 may include any number of content servers 118. Each content server 118 may store a plurality of content 120, 122, 124. Content 120, 122, 124 may include any combination of music, videos, movies, TV programs, multimedia, images, still pictures, text, graphics, gaming applications, advertisements, programming content, public service content, government content, community content, software, and/or any other content or data objects in electronic form.

In some embodiments, each content server 118 may store different versions of a given content 120, 122, 124. For example, content server 118A in CDN 114A may store 4 different versions of content-A 120-1 to 120-4. The different versions 120-1 to 120-4 may represent the content-A 120 encoded at different bit rates, with higher bit rates resulting in higher resolution versions of content-A 120. Accordingly, the different versions 120-1 to 120-4 may represent different bit rate variants of content-A 120. While the example of FIG. 1 shows either 3 or 4 bit rate variants of the contents 120, 122, 124, in practice the content servers 118 may store any number of bit rate variants of the contents stored therein. Also, for purposes of illustration and not limitation, this disclosure uses the convention that a larger index refers to a higher bit rate. Thus, content-A 120-2 is the next higher bit-rate variant relative to content-A 120-1.

Multimedia environment 102 may also include one or more crowdsource servers 112. The crowdsource servers 112 may each store one or more databases 116 and be configured to communicate with the network 108.

Figure 2:
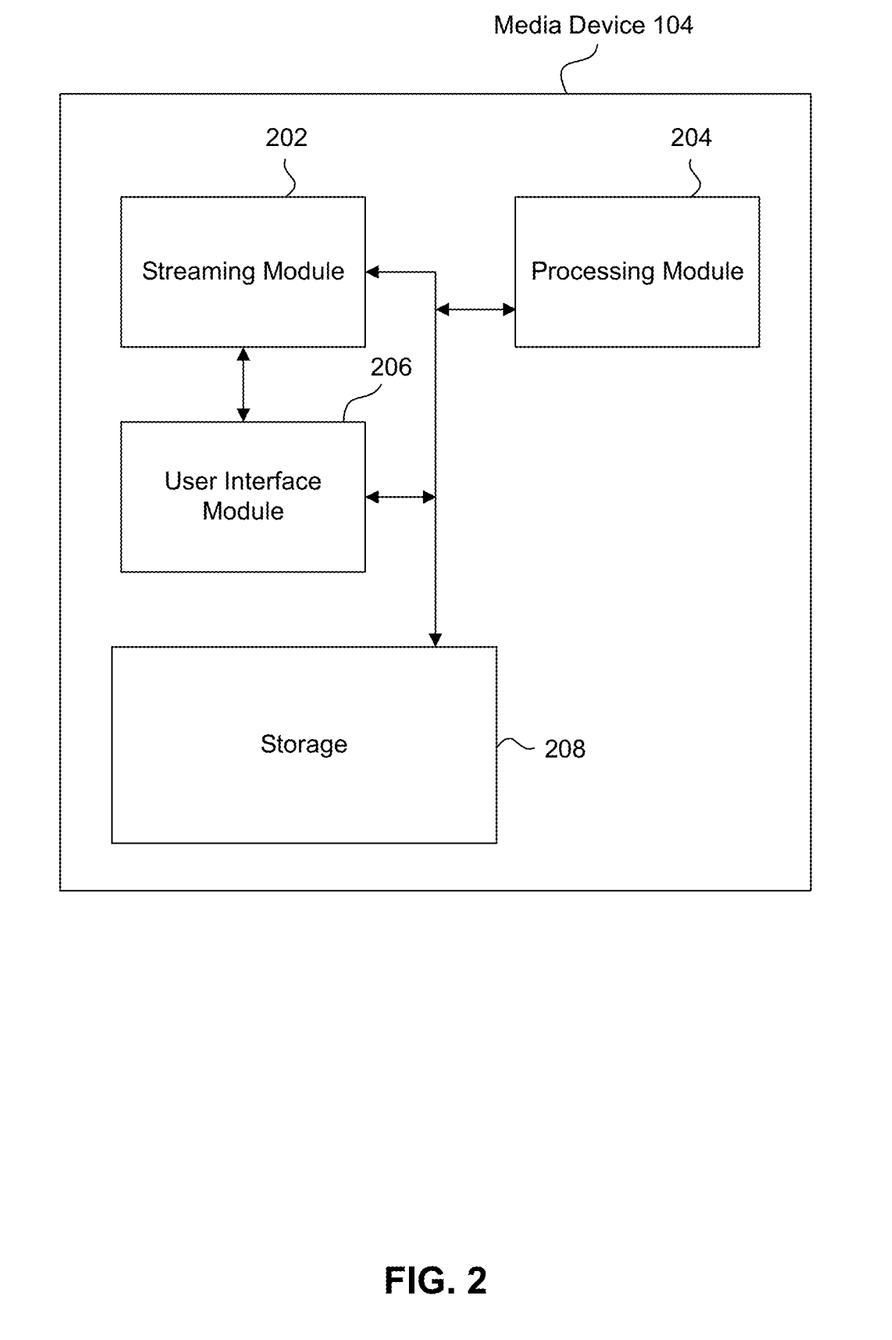
FIG. 2 illustrates a block diagram of a media device, according to some embodiments.

FIG. 2 illustrates an example block diagram of the media device 104, according to some embodiments. Media device 104 may include a streaming module 202, processing module 204, user interface module 206 and storage 208.

Now referring to FIGS. 1 and 2, in some embodiments, a user (not shown) at any of the media devices 104 (sometimes herein called the user's local media device 104) may interact with the media device 104 via, for example, a remote control (not shown). The remote control can be any component, part, apparatus and/or method for controlling the local media device 104 and/or display device 106, such as a remote control, a tablet, laptop computer, smartphone, wearable, on-screen controls, integrated control buttons, audio controls, or any combination thereof, to name just a few examples.

The user may use the remote control to interact with the user interface module 206 of the local media device 104 to select content, such as a movie, TV show, music, book, application, game, etc. The streaming module 202 of media device 104 may request the selected content from content server(s) 118 over the network 108. Content server(s) 118 may transmit the requested content to the streaming module 202. Media device 104 may transmit the received content to its associated display device 106 for presentation to the user. In streaming embodiments, the streaming module 202 may transmit the content to display device 106 in real time or near real time as it receives such content from content server(s) 118. In non-streaming embodiments, the local media device 104 may store the content received from content server(s) 118 in storage 208 for later playback on display device 106.

In embodiments involving CDNs 114, such as the example shown in FIG. 1, requests for content are routed to the content server 118 that is best able to serve the request. This may involve, for example, routing the content request to a content server 118 in a CDN 114 that is geographically closest to the requesting media device 104, or one having the most capacity, or one having the greatest communication bandwidth, etc.

Figure 3:
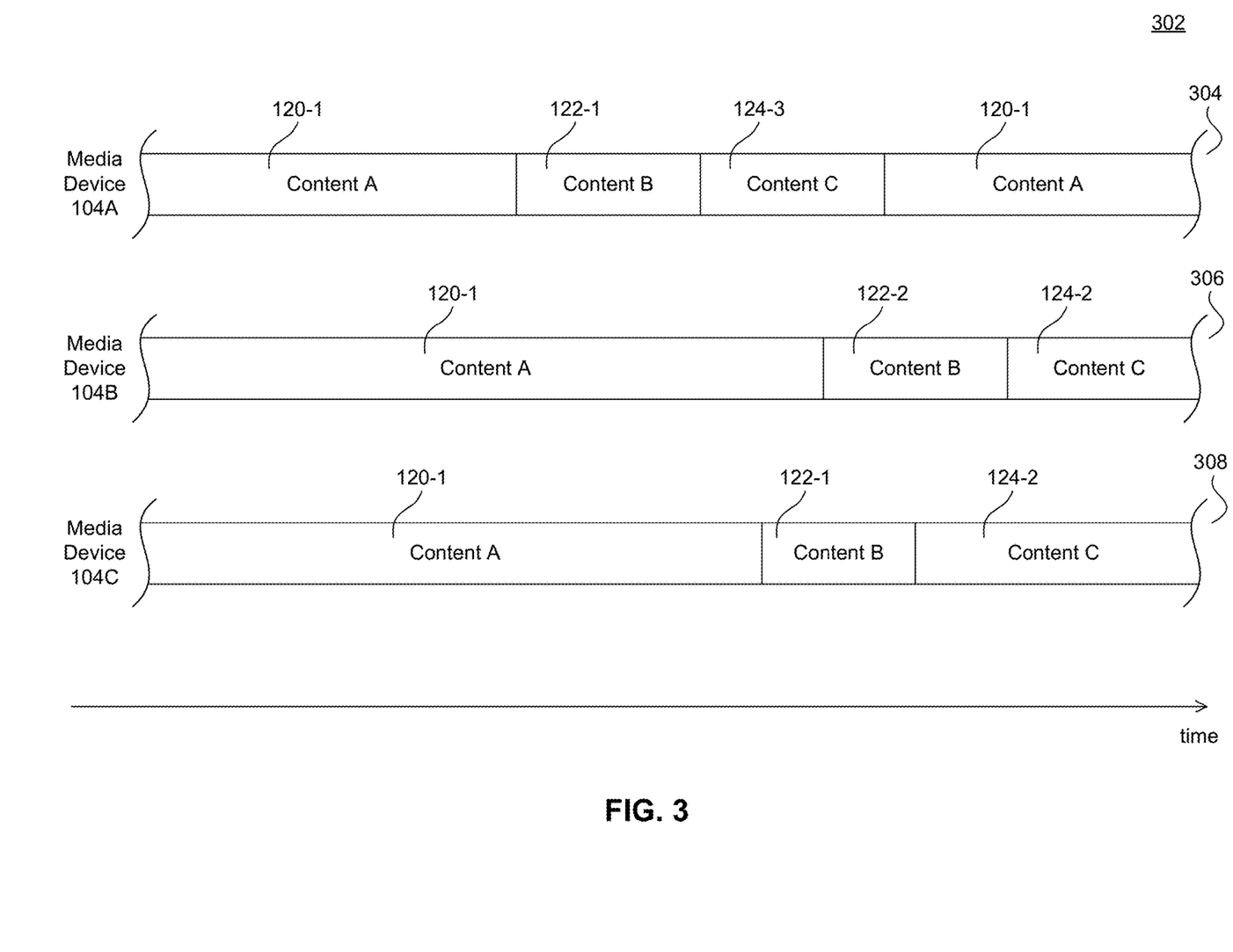
FIG. 3 illustrates an example scenario of content being delivered to media devices, according to some embodiments.

In some embodiments, secondary content may be stitched into the viewing of primary content. For example, while a user is watching a movie (i.e., the primary content) using his local media device 104 and associated display device 106, the primary content may be momentarily suspended and a clip about future programming or a public service announcement (i.e., the secondary content) may be displayed. In other words, the secondary content is stitched into the streaming of the primary content. This is illustrated in FIG. 3 at 304, where at media device 104A, content-B 122-1 and content-C 124-3 (representing the secondary content) are stitched into the stream of content-A 120-1 (representing the primary content). In a non-limiting example, the primary content can be a movie or TV show, and the secondary content can be an advertisement, future programming message, public service or community service announcement, information issued by the government, weather information, local device information (such as information relating to network 108, media device 104A, and/or display device 106A), etc.

In order to stitch the secondary content into the primary content, the media device 104 must retrieve the secondary content from one or more content servers 118 (unless the secondary content is locally stored). As noted above, in some embodiments, the content servers 118 store multiple bit-rate variants of the content 120, 122, 124. In some embodiments, to provide a high resolution viewing experience, it would be preferable to retrieve a high bit-rate variant of the secondary content. But, conditions of the local media device 104, ISP 110, network 108, CDNs 114 and/or content servers 118 may result in buffering at the local media device 104 if a high bit-rate variant is downloaded, which would degrade the user's viewing experience. Such conditions include network capacity, bandwidth, traffic, ISP bottlenecks, local WIFI conditions, distance, and congestion, to name just some examples. This problem is exacerbated with the use of content delivery networks, because the primary and secondary content may be delivered over different CDNs having different conditions, capabilities, capacities and performance.

Accordingly, some embodiments of this disclosure automatically and intelligently predict performance of content delivery networks in a crowdsourced manner in order to deliver the highest resolution content possible with little or no buffering. Such embodiments leverage the fact that millions of media devices 104 exist around the world, and they stream an enormous amount of content. For example, ROKU alone streams over a billion hours of video per month, a 61 percent increase over 2016. (Bloomberg Technology, May 2017).

In such embodiments, the media devices 104 provide the crowdsource server 112 with information regarding previous downloads of content 120, 122, 124. The crowdsource server 112 uses this information to predict the ability and performance of CDNs to download content 120, 122, 124 in the future. More particularly, the crowdsource server 112 uses the information from media devices 104 to predict, for any given media device 104, the expected performance of future downloads of each of the bit-rate variants of a given content 120, 122, 124 to the media device 104. Using these predictions from the crowdsource server 112, the media device 104 can download a relatively higher resolution bit-rate variant of the content while reducing or completely eliminating buffering.

Such operation is further described with reference to the example shown in FIG. 3. Referring to 304, media device 104A is streaming content-A 120-1 from content server 118A in CDN 114A. Then, media device 104A downloads content-B 122-1 from content server 118B in CDN 114A and content-C 124-3 from content server 118D in CDN 114C, and stitches them into the stream of content-A 120-1. According to some embodiments, media device 104A provides the crowdsource server 112 with information regarding such downloads of content-B 122-1 and content-C 124-3 (as well as content-A 120-1 in some embodiments). For the download of each of content-B 122-1 and content-C 124-3, such information may identify, for example, the ISP 110 used for the download, the geographical location of media device 104A, the bit-rate variant that was downloaded, the content server 118 and/or CDN 114 that the content was downloaded from, performance characteristics of the download (such as the actual download speed and bandwidth experienced by the media device 104A during the download), performance characteristics of the local WIFI, the amount of buffering at the media device 104A caused by or related to the download, etc.

Now referring to 306, media device 104B is also streaming content-A 120-1 from content server 118A in CDN 114A. Then, content-B 122 is to be stitched into the stream of content-A 120-1. A number of bit-rate variants of content-B 122 exist (see 122-1 through 122-3 in content server 118B, for example). Thus, according to some embodiments, the media device 104B requests that the crowdsource server 112 identify the bit-rate variant of content-B 122 to download. The request may include information that identifies, for example, the media device 104B, the content that is desired to be downloaded, the geographical location of the media device 104B, the ISP 110A of the media device 104B, etc.

As shown in the example of FIG. 1, media device 104B and media device 104A are located in the same geographical location and have the same ISP 110A. Assume that, as part of 304, media device 104A previously reported to the crowdsource server 112 that the previous download of content-B 122-1 proceeded at satisfactory speed with no buffering. Because media device 104B and media device 104A are located in the same geographical location and have the same ISP 110A, and because the download of content-B 122 is close in time for both media devices 104A and 104B, the crowdsource server 112 may predict that media device 104B will experience the same network and download conditions for the same content-B 122 as media device 104A. Accordingly, the crowdsource server 112 may recommend to media device 104B that it should download a higher bit-rate variant of content-B 122, that is, content-B 122-2. This is shown in 306 of FIG. 3. In a similar manner, the crowdsource server 112 may next recommend to media device 104B that it should download a lower bit-rate variant of content-C 124 (that is, content-C 124-2) if the previous download of content-C 124-3 by media device 104A (in 304) was slower than a threshold or caused buffering.

Referring to another example, in 308, media device 104C is also streaming content-A 120-1 from content server 118A in CDN 114A. In this example, as with 304 and 306, media device 104C next needs to download content-B 122 and content-C 124 to stitch into the stream of content-A 120-1. As discussed above, media device 104C requests that the crowdsource server 112 identify the bit-rate variants of content-B 122 and content-C 124 to download. In the example of FIG. 1, media device 104C is geographically distant from media devices 104A, 104B and uses a different ISP 110B. Thus, information from media devices 104, 104B regarding previous downloads of content-B 122 and content-C 124 may not be particularly relevant to future downloads of content-B 122 and content-C 124 by media device 104C. This may be the case because, in addition to using different ISPs 110, different CDNs 114 may also be used (for example, downloads of content-B 122 by media device 104C may be serviced by content server 118C in CDN 114B rather than content server 118B in CDN 114A). Thus, the crowdsource server 112 may opt to recommend that media device 104C download the lowest bit-rate variant previously downloaded, that is, content-B 122-1 and content-C 124-2. This is shown in 308 of FIG. 3. Note, however, that even this conservative approach results in downloading a relatively high bit-rate variant (that is, content-C 124-2 rather than content-C 124-1).

Figure 4:
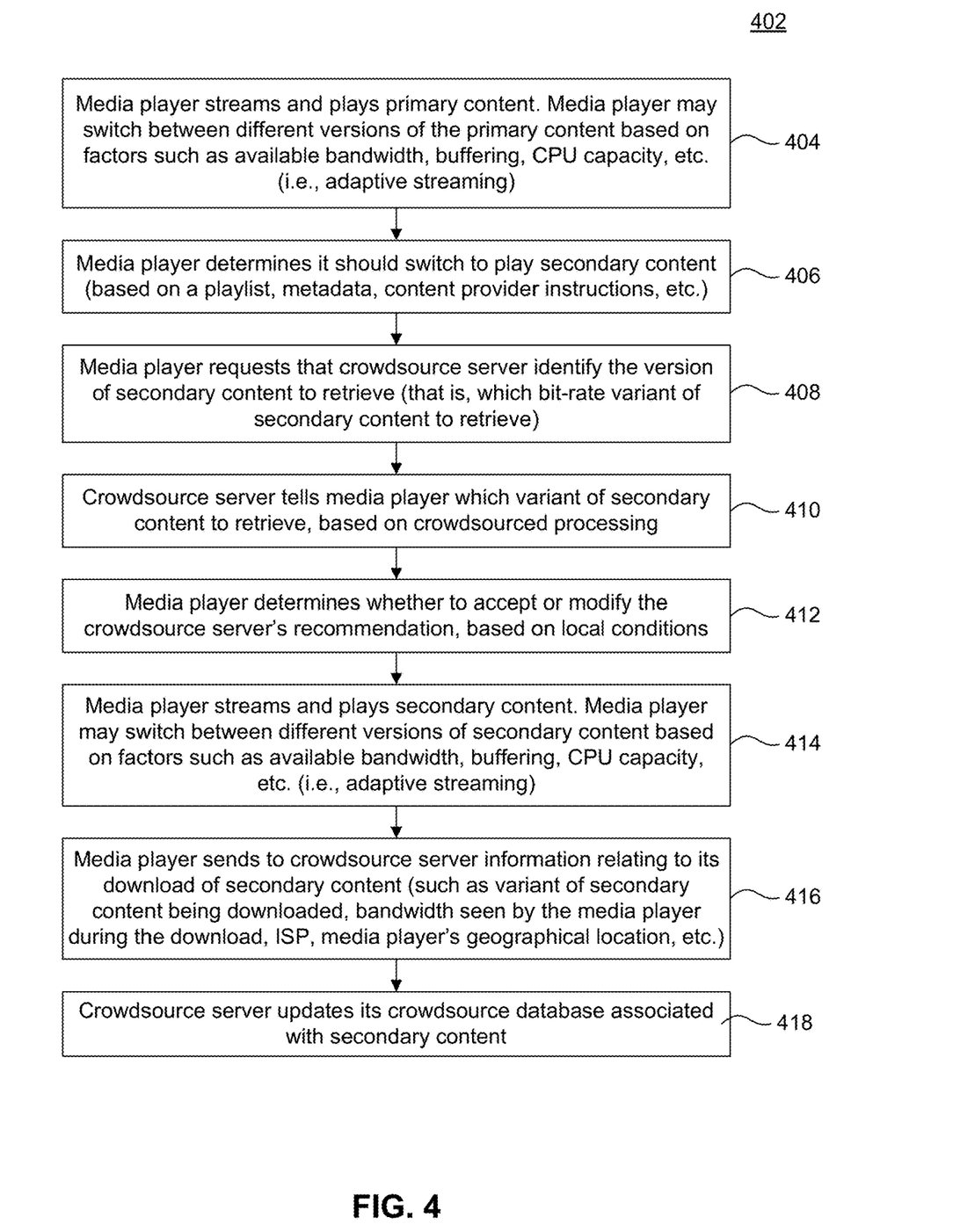
FIG. 4 is a flowchart illustrating a process for intelligently predicting CDN performance in a crowdsourced manner, in order to deliver content with little or no buffering, according to some embodiments.

FIG. 4 is a method 402 illustrating a process for automatically and intelligently predicting performance of content delivery networks in a crowdsourced manner in order to deliver the highest resolution content possible with little or no buffering, according to some embodiments. Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 402 shall be described with reference to FIGS. 1 and 3. However, method 402 is not limited to that example embodiment.

In 404, a media device may download and play primary content. After download and play begins, the media device may employ adaptive streaming to switch between different bit-rate variants of the primary content, depending on factors such as available bandwidth, buffering, CPU capacity, local WIFI conditions, congestion, etc. Referring to the example 306 in FIG. 3, in 402 the media device 104B may download and play content-A 120-1. The primary content may be a movie or TV show, and/or any other type of content discussed herein or otherwise presently existing.

In 406, the media device may determine it should switch to download and play secondary content. In other words, the media device may determine it should stitch in secondary content into the stream of the primary content. This determination may be based on a playlist, metadata in the primary content, instructions from the content provider or content server, or any other criteria or conditions. Referring to the example 306 in FIG. 3, in 406 the media device 104B may determine it should stitch in content-B 122 into the stream of content-A 120-1. The secondary content can be an advertisement, future programming message, public service or community service announcement, information issued by the government, weather information, and/or any other type of content discussed herein or otherwise presently existing.

In 408, the media device may request that a crowdsource server identify the bit-rate variant of the secondary content that should be downloaded (this media device is sometimes referred to herein as the requesting media device). Referring to the example 306 in FIG. 3, in 408 the media device 104B may request that the crowdsource server 112 identify the bit-rate variant of content-B 122 that should be downloaded. The request may include information that identifies, for example, the requesting media device 104B, the content that is desired to be downloaded, the geographical location of the media device 104B, the ISP 110A of the media device 104B, etc.

In 410, the crowdsource server identifies to the requesting media device which bit-rate variant of the secondary content to download. Referring to the example 306 in FIG. 3, in 410 the crowdsource server 112 tells the media device 104B which bit-rate variant of content-B 122 to download. In embodiments, step 410 is performed automatically and intelligently, in a crowdsourced manner.

Figure 5:
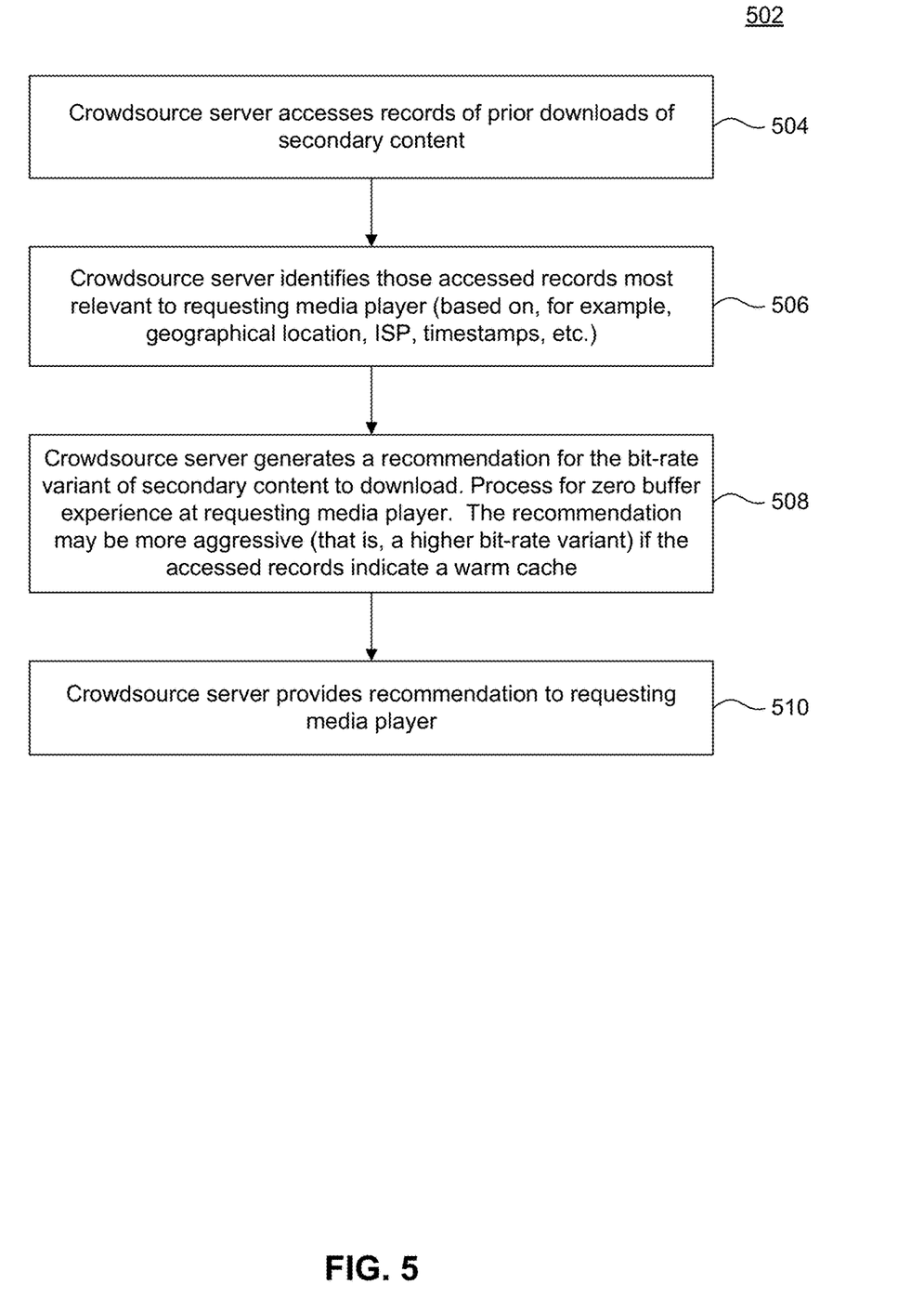
FIG. 5 is a flowchart illustrating a process in a crowdsource server, wherein the crowdsource server determines which bit-rate variant of a given content to download based on data received from a plurality of media devices, according to some embodiments.

FIG. 5 illustrates a method 502 for implementing 410 of FIG. 4. Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 502 shall be described with reference to FIGS. 1 and 3. However, method 502 is not limited to that example embodiment.

In 504, the crowdsource server may access records relating to prior downloads of the secondary content. Referring to the example 306 in FIG. 3, in 504 the crowdsource server 112 may access records from databases 116 relating to prior downloads of content-B 122. For each such prior download, the information may identify the ISP 110 used for the download, the geographical location of the media device 104 that requested and received the download, the content and bit-rate variant that was downloaded, the content server 118 and/or CDN 114 that the content was downloaded from, performance characteristics of the download (such as the actual download speed and bandwidth experienced by the media device 104 during the download), performance characteristics of the local WIFI, the amount of buffering at the requesting media device 104 caused by or related to the download, etc.

In 506, the crowdsource server may identify the accessed records of prior downloads that are most relevant to the requesting media device and the secondary content that is being downloaded. Such identification may be based on a number of factors, such as the geographical location of the requesting media device, the ISP 110 of the requesting media device, the content servers 118 and CDNs 114 where the secondary content is stored, timestamps of previous downloads, etc. For example, relevant records may include, but are not limited to:

records of prior downloads involving the same ISP 110;
records of prior downloads that are close in time to when step 506 is being performed;
records of prior downloads to media devices that are in the same geographical area as the requesting media device; and/or
records of prior downloads from content servers 118 and/or CDNs 114 that are geographically close to the requesting media device.

It is noted that any combination of the above factors may be used to identify records relevant to the requesting media device and the secondary content that is being downloaded.

In 508, the crowdsource server 112 may use the records identified in 506 to generate a recommendation for the bit-rate variant of the secondary content to download. The crowdsource server 112 may generate this recommendation to achieve little or no buffering at the requesting media device (that is, to achieve a zero buffer experience at the requesting media device). Where there are multiple identified records, the crowdsource server 112 may average the records to generate the recommendation. For example, referring to 306 in FIG. 3, assume the identified records indicate the following 7 satisfactory prior downloads of content-B 122 (where a satisfactory download is measured against predetermined criteria and/or thresholds): 122-1, 122-2, 122-2, 122-3, 122-3, 122-3, 122-3. In this case, the average is 2.43. For this example, to better ensure a zero buffer experience at the requesting media device, the crowdsource server 112 may employ a conservative bias and thereby generate a recommendation of content-B 122-2 to download.

In some embodiments, the crowdsource server 112 in 508 may consider whether the identified records indicate a warm cache of the secondary content in generating its recommendation. A warm cache is said to exist if the secondary content is stored in a content server 118 of a CDN 114 that is located geographically close to the requesting media device (that is, the distance between the requesting media device and the content server 118 in the CDN 114 is within a predetermined warm cache threshold). If the identified records indicate a warm cache of the secondary content, then the crowdsource server 112 in 508 may employ a more aggressive bias when generation the recommendation of which bit-rate variant of the secondary content to download. In the above scenario, for example, the crowdsource server 112 may generate a recommendation of content-B 122-3 to download, rather than content-B 122-2.

In 510, the crowdsource server 112 may communicate its recommendation from step 508 to the requesting media device. Referring to the example 306 in FIG. 3, in 510 the crowdsource server 112 may send a message to the media device 104B over network 108, where the message indicates that the crowdsource server 112 recommends that the media device 104B download content-B 122-2 for stitching into the stream of content-A 120-1.

Referring back to FIG. 4, in 412, the media device may determine whether to accept or modify the recommendation from the crowdsource server 112. This determination may be based on a number of factors, such as local WIFI conditions, conditions of the media device, characteristics of the associated display device, etc. Referring to the example 306 in FIG. 3, in 412 the media device 104B may modify the crowdsource server 112's recommendation and instead download a lower resolution version of content-B 122 (such as content-B 122-1 rather than content-B 122-2) for any number of reasons, such as if the local WIFI is currently degraded, the media device 104B has limited storage 208 for any needed buffering, the associated display device 106B is not of sufficient quality to take advantage of the higher bit-rate variant, etc. In contrast, the media device 104B may modify the crowdsource server 112's recommendation and instead download a higher resolution version of content-B 122 (such as content-B 122-3 rather than content-B 122-2) for any number of reasons, such as if performance of the local WIFI has recently improved, or if less congestion on network 108 has been detected.

In 414, the media device may download and play the bit-rate variant of the secondary content determined in 412. After download and play begins, the media device may employ adaptive streaming to switch between different bit-rate variants of the secondary content, depending on factors such as available bandwidth, buffering, CPU capacity, local WIFI conditions, congestion, etc. Referring to the example 306 in FIG. 3, in 414 the media device 104B may download and play content-B 122-2 (assuming this bit-rate variant of content-B 122 was determined in 412).

In 416, after download and playing of the secondary content is complete in 414, the requesting media device may transmit to the crowdsource server 112 information relating to the download of the bit-rate variant of the secondary content determined in 412. Such information may identify the ISP 110 used for the download, the geographical location of the requesting media device 104, the content and bit-rate variant that was downloaded, the content server 118 and/or CDN 114 that the content was downloaded from, performance characteristics of the download (such as the actual download speed and bandwidth experienced by the media device 104 during the download), performance characteristics of the local WIFI, the amount of buffering at the requesting media device 104 caused by or related to the download, etc. If adaptive streaming was employed in 414, then the media device may transmit such information to the crowdsource server 112 for each bit-rate variant of the secondary information downloaded during performance of 414.

In 418, the crowdsource server 122 stores the information received in 416 in the databases 116.

In embodiments, steps 406-418 are performed for each secondary content stitched into the streaming of the primary content (such as for the stitching on content-C 124 into the streaming of content-A 120-1 in 306 of FIG. 3). Also or alternatively, in some embodiments, steps 408-418 are performed when primary content is newly played (such as the commencement of step 404).

Crowdsourced Blacklisting of Content to Improve Playback

Sometimes, a given content 120, 122, 124 may not be in a form that is practical or even possible for playback. For example, a given secondary content that is to be stitched into the playback of primary content may have a video or audio format that is not supported by the local media device 104 and/or display device 106, or may have an excessively high bitrate, or may be too large for practical download and playback, to name just some examples. Thus, trying to play such secondary content may result in an error or excessive buffering, or otherwise detract from the user's viewing experience. Accordingly, in some embodiments, content 120, 122, 124 may be blacklisted, and media players 104 may be configured to avoid playing blacklisted content 120, 122, 124. Such embodiments may operate in a crowdsourced manner.

Figure 6:
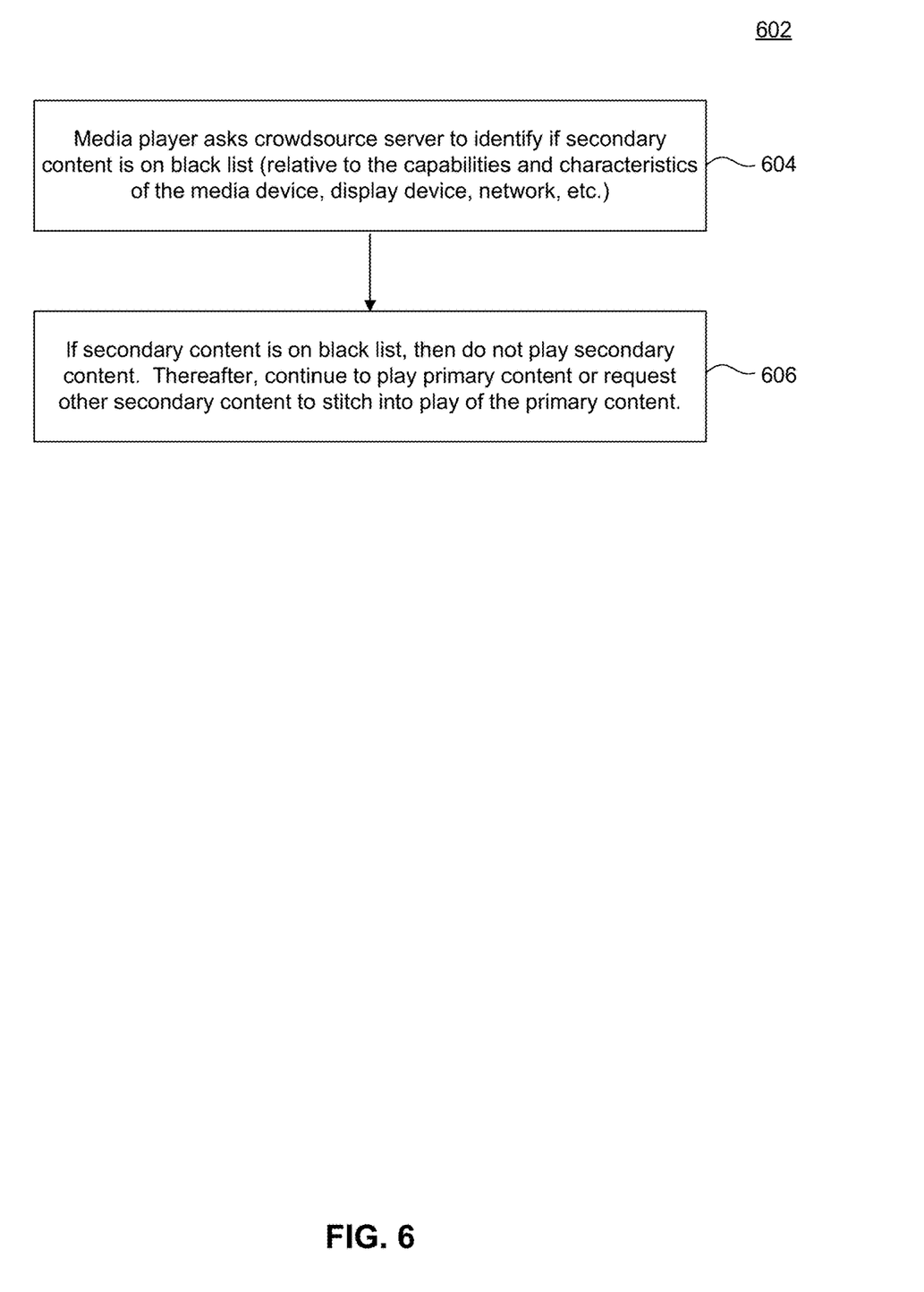
FIG. 6 is a flowchart illustrating a process for determining in a crowdsourced manner if a given content is blacklisted, according to some embodiments.

FIG. 6 illustrates a method 602 for determining in a crowdsourced manner if a given content 120, 122, 124 is blacklisted, according to some embodiments. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 602 shall be described with reference to FIGS. 1, 3 and 4. However, method 602 is not limited to that example embodiment.

Method 602 may operate as part of step 412 and/or other steps in FIG. 4, although method 602 is not limited to that example embodiment. More generally, method 602 may operate whenever a media device 104 is operating to stitch secondary content into the playback of primary content (such as the examples shown in FIG. 3).

In 604, the media device 104 may query the crowdsource server 112 to identify if the secondary content (that is to be stitched into the primary content) is on a blacklist. A given content 120, 122, 124 may be placed on the blacklist if it is in a form that is not practical or even possible for playback. The crowdsource server 112 may maintain one or more blacklists in databases 116. Different blacklists may exist for different media devices 104, display devices 106, and/or network capabilities. For example, media devices 104 and display devices 106 may have different audio/video codecs, different memory sizes, different processing and display capabilities, etc. Also, WIFI bandwidths and speeds may differ. Some media devices 104 may be able to play a given content 120, 122, 124, while others cannot. The same is true for display devices 106. Also, some local WIFI networks may be able to accommodate the download of a given content 120, 122, 124, while others cannot.

Thus, the blacklists maintained by the crowdsource server 112 may be associated with different combinations of media devices 104, display devices 106 and network capabilities. For example, and generally speaking, a first blacklist may be associated with higher speed devices while a second blacklist may be associated with lower speed devices. In making the query in 604, the media device 104 may include in the query information identifying the type and/or capabilities of the local media device 104, display device 106 and network. The crowdsource server 112 may use this information in 606 to identify the appropriate blacklist.

In 606, the crowdsource server 112 looks up the secondary content in the blacklist appropriate to the requesting media device 104, and returns information to the media device 104 indicating whether the secondary content is blacklisted. If the secondary content is not blacklisted, then the media device 104 plays the secondary content or otherwise operates as described above in step 412 of FIG. 4.

If, instead, the secondary content is blacklisted, then the media device 104 does not play the content. Depending on the embodiment, the media device 104 may continue to play the primary content, or may request other secondary content to play from content server(s) 118, or may operate as described above in step 412 of FIG. 4 (for example, the media device 104B may modify the crowdsource server 112's recommendation and instead download a lower resolution version of the secondary content).

Figure 7:
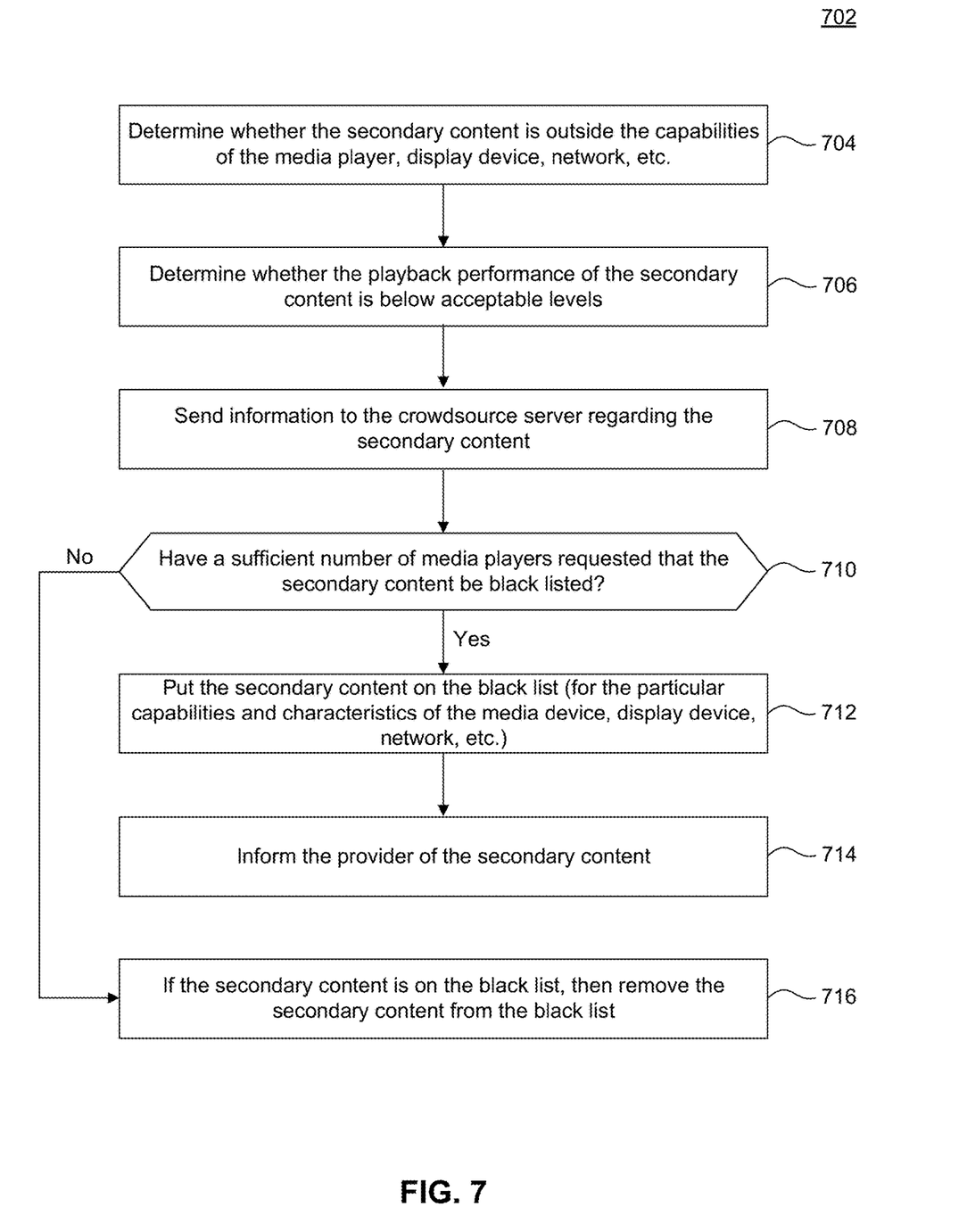
FIG. 7 is a flowchart illustrating a process for adding or removing a given content from a blacklist in a crowdsourced manner, according to some embodiments.

FIG. 7 illustrates a method 702 for adding or removing a given content from a blacklist in a crowdsourced manner, according to some embodiments. Method 702 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 702 shall be described with reference to FIGS. 1, 3 and 4. However, method 702 is not limited to that example embodiment.

Method 702 may operate as part of step 414 and/or other steps of FIG. 4, although method 702 is not limited to that example embodiment. More generally, method 702 may operate whenever a media device 104 operates to stitch secondary content into the playback of primary content (such as the examples shown in FIG. 3).

In 704, the media device 104 may determine whether the secondary content (that is to be stitched into the primary content) is outside the download and playback capabilities of the media device 104, display device 106 and/or network 108. For example, the secondary content may have a video or audio format that is not supported by the media device 104 and/or display device 106 (for example, they may not have a compatible codec), or may have an excessively high bitrate given the capabilities of the media device 104 and/or display device 106, or may be too large to download given the current speed and bandwidth of network 108 and/or the local WIFI.

In step 706, if the media device 104 decides to attempt to download and play the secondary content, then the media device 104 may determine whether the performance of such playback is below predetermined acceptable levels. For example, the media device 104 may determine if playback of the secondary content results in buffering greater than a predetermined threshold.

In 708, the media device 104 may send information to the crowdsource server 112 detailing the determinations of steps 704 and 706. For example, such information may indicate (1) whether playback of the secondary content is or is not supported by the capabilities of the media device 104, display device 106 and/or network 108; and/or (2) whether playback performance of the secondary content is or is not within acceptable levels and thresholds. If playback of the secondary content is not supported by the capabilities of the media device 104, display device 106 and/or network 108, and/or playback performance of the secondary content is not within acceptable levels and thresholds, then such information may also include a request by the media device 104 that the secondary content be placed on the blacklist. The request may include information identifying the type and/or capabilities of the media device 104, display device 106 and network, so that the secondary content can be placed in the appropriate blacklist.

In 710, the crowdsource server 112 may determine whether a sufficient number of media devices 104 of similar type and capabilities (when taking into consideration the type and capabilities of the media device 104 and the associated display device 106 and network) have requested that the secondary content be blacklisted. For example, the crowdsource server 112 in 710 may determine whether the number of similar media devices 104 requesting that the secondary content be blacklisted exceeds a predetermined threshold, where the threshold may be an integer value greater than 0.

If the number of similar media devices 104 requesting that the secondary content be blacklisted exceeds the predetermined threshold, then in 712, crowdsource server 112 may add the secondary content to the blacklist corresponding to the type and/or capabilities of the media device 104, display device 106 and network for which the determination was performed in 710.

In 714, the crowdsource server 112 may send a message to the provider of the secondary content, to inform the provider of the blacklisting of its content. The message may specify the flaws of the secondary content (for example, the message may indicate that the secondary content is in an unsupported audio or video format, has an excessively high bitrate, is too large, etc.). In this manner, the provider will have information necessary to modify the secondary content so as to eventually remove the secondary content from the blacklist through subsequent performance of method 702 as applied to the secondary content.

If in 710 it is determine that a sufficient number of similar media devices 104 have not requested that the secondary content be blacklisted, and if the secondary content is currently on a blacklist corresponding to the type and/or capabilities of the media device 104, display device 106 and network for which the determination was performed in 710, then in 716 the crowdsource server 112 may remove the secondary content from the blacklist. In this manner, content providers can modify and improve their content (as described in step 710) in order to have their content eventually removed from blacklists.

Example Computer System

Figure 8:
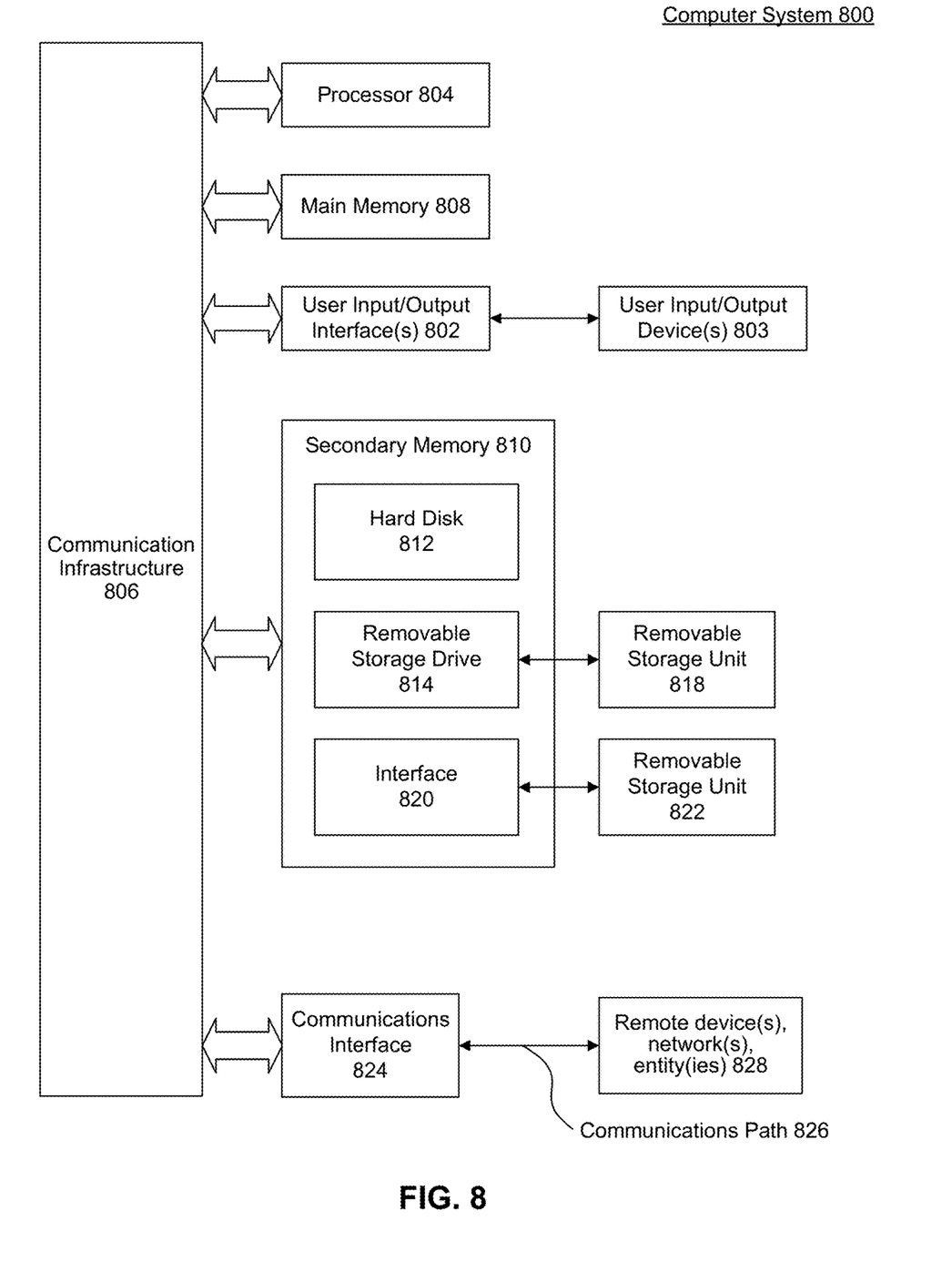
FIG. 8 illustrates an example computer system useful for implementing various embodiments.

Various embodiments and/or components therein can be implemented, for example, using one or more computer systems, such as computer system 800 shown in FIG. 8. Computer system 800 can be any computer or computing device capable of performing the functions described herein. For example, one or more computer systems 800 can be used to implement any embodiments of FIGS. 1-7, and/or any combination or sub-combination thereof.

Computer system 800 includes one or more processors (also called central processing units, or CPUs), such as a processor 804. Processor 804 is connected to a communication infrastructure or bus 806.

One or more processors 804 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 can include one or more levels of cache. Main memory 808 has stored therein control logic (i.e., computer software) and/or data.

Computer system 800 can also include one or more secondary storage devices or memory 810. Secondary memory 810 can include, for example, a hard disk drive 812 and/or a removable storage device or drive 814. Removable storage drive 814 can be a floppy disk drive, a magnetic tape drive, a compact disk drive, an optical storage device, tape backup device, and/or any other storage device/drive.

Removable storage drive 814 can interact with a removable storage unit 818. Removable storage unit 818 includes a computer usable or readable storage device having stored thereon computer software (control logic) and/or data. Removable storage unit 818 can be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 can include other means, instrumentalities or other approaches for allowing computer programs and/or other instructions and/or data to be accessed by computer system 800. Such means, instrumentalities or other approaches can include, for example, a removable storage unit 822 and an interface 820. Examples of the removable storage unit 822 and the interface 820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 can further include a communication or network interface 824. Communication interface 824 enables computer system 800 to communicate and interact with any combination of remote devices, remote networks, remote entities, etc. (individually and collectively referenced by reference number 828). For example, communication interface 824 can allow computer system 800 to communicate with remote devices 828 over communications path 826, which can be wired and/or wireless, and which can include any combination of LANs, WANs, the Internet, etc. Control logic and/or data can be transmitted to and from computer system 800 via communication path 826.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A crowdsource server, comprising:
a memory; and
at least one processor communicatively coupled to the memory and configured to:
receive, from a media device, a request to identify a bit-rate valiant of a secondary content among a plurality of bit-rate variants of the secondary content to stitch into a stream of a primary content;
access records of prior downloads of the secondary content by a plurality of media devices, wherein the records were provided to the crowdsource server by the plurality of media devices in a crowdsourced manner;
identify a subset of the records of the prior downloads of the secondary content by the plurality of media devices that are relevant to the media device based on the request from the media device;
generate a recommendation for the bit-rate variant of the secondary content among the plurality of bit-rate variants of the secondary content at a server among a plurality of servers to download by the media device based on the subset of the records; and
provide the recommendation to the media device;
wherein the media device downloads the recommended bit-rate variant of the secondary content from the server, and stitches the downloaded bit-rate variant of the secondary content into the stream of the primary content.

2. The crowdsource server of claim 1, wherein to generate the recommendation, the at least one processor is further configured to:
generate the recommendation so as to achieve a zero buffer experience at the media device.

3. The crowdsource server of claim 1, wherein to generate the recommendation, the at least one processor is further configured to:
determine that the secondary content is warm cached; and
use a more aggressive bias to generate the recommendation such that the recommendation is for a higher bit-rate variant of the secondary content.

4. The crowdsource server of claim 1, wherein to access records of prior downloads of the secondary content, the at least one processor is further configured to:
identify the prior downloads of the secondary content based on at least one of:
whether a prior download involved a same internet service provider of the media device;
whether a prior download is close in time to a present download;
whether a prior download was to another media device that is geographically close to the media device; and
whether a prior download involved a content server in a content distribution network that is geographically close to the media device.

5. The crowdsource server of claim 1, further comprising:
one or more databases comprising one or more blacklists, each blacklist corresponding to a type and capabilities of a combination of media device, display device and network and listing content that should not be downloaded and played by the combination of media device, display device and network.

6. A method in a crowdsource server, comprising:
receiving, from a media device, a request to identify a bit-rate variant of a secondary content among a plurality of bit-rate variants of the secondary content to stitch into a stream of a primary content;
accessing records of prior downloads of the secondary content by a plurality of media devices, wherein the records were provided to the crowdsource server by the plurality of media devices in a crowdsourced manner;
identifying a subset of the records of the prior downloads of the secondary content by the plurality of media devices that are relevant to the media device based on the request from the media device;
generating a recommendation for the bit-rate variant of the secondary content among the plurality of bit-rate variants of the secondary content at a server among a plurality of servers to download by the media device based on the subset of the records; and
providing the recommendation to the media device;
wherein the media device downloads the recommended bit-rate variant of the secondary content from the server, and stitches the downloaded bit-rate variant of the secondary content into the stream of the primary content.

7. The method of claim 6, wherein generating the recommendation comprises:
generating the recommendation so as to achieve a zero buffer experience at the media device.

8. The method of claim 6, wherein generating the recommendation comprises:
determining that the secondary content is warm cached; and
using a more aggressive bias to generate the recommendation such that the recommendation is for a higher bit-rate variant of the secondary content.

9. The method of claim 6, wherein accessing records of prior downloads of the secondary content comprises:
identifying the prior downloads of the secondary content based on at least one of:
whether a prior download involved a same internet service provider of the media device;
whether a prior download is close in time to a present download;
whether a prior download was to another media device that is geographically close to the media device; and
whether a prior download involved a content server in a content distribution network that is geographically close to the media device.

10. The method of claim 6, further comprising:
receiving a blacklist related query from the media device, wherein the query includes information identifying a type and capabilities of a combination of the media device and an associated display device and network;
accessing a blacklist corresponding to the combination, to determine whether the combination is capable of downloading and playing the secondary content; and
providing the determination to the media device.

11. A non-transitory computer readable medium having instructions stored thereon that, when executed by at least one computing device, cause the at least one computing device to perform operations comprising:
receiving, from a media device, a request to identify a bit-rate variant of a secondary content among a plurality of bit-rate variants of the secondary content to stitch into a stream of a primary content;
accessing records of prior downloads of the secondary content by a plurality of media devices, wherein the records were provided to the crowdsource server by the plurality of media devices in a crowdsourced manner;
identifying a subset of the records of the prior downloads of the secondary content by the plurality of media devices that are relevant to the media device based on the request from the media device;
generating a recommendation for the bit-rate valiant of the secondary content among the plurality of bit-rate variants of the secondary content at a server among a plurality of servers to download by the media device based on the subset of the records; and providing the recommendation to the media device;
wherein the media device downloads the recommended bit-rate variant of the secondary content from the server, and stitches the downloaded bit-rate variant of the secondary content into the stream of the primary content.

12. The non-transitory computer readable medium of claim 11, wherein generating the recommendation comprises:
generating the recommendation so as to achieve a zero buffer experience at the media device.

13. The non-transitory computer readable medium of claim 11, wherein generating the recommendation comprises:
determining that the secondary content is warm cached; and
using a more aggressive bias to generate the recommendation such that the recommendation is for a higher bit-rate variant of the secondary content.

14. The non-transitory computer readable medium of claim 11, wherein accessing records of prior downloads of the secondary content comprises:
identifying the prior downloads of the secondary content based on at least one of:
whether a prior download involved a same internet service provider of the media device;
whether a prior download is close in time to a present download;
whether a prior download was to another media device that is geographically close to the media device; and
whether a prior download involved a content server in a content distribution network that is geographically close to the media device.

15. The non-transitory computer readable medium of claim 11, the operations further comprising:
receiving a blacklist related query from the media device, wherein the query includes information identifying a type and capabilities of a combination of the media device and an associated display device and network;
accessing a blacklist corresponding to the combination, to determine whether the combination is capable of playing the secondary content; and
providing the determination to the media device.

16. A media device, comprising:
a memory; and
at least one processor communicatively coupled to the memory and configured to:
download and display a primary content on a display device;
determine that a secondary content should be stitched into the display of the primary content;
request that a crowdsource server determine a bit-rate variant of the secondary content among a plurality of bit-rate variants of the secondary content to download, wherein the crowdsource server determines the bit-rate variant of the secondary content in a crowdsourced manner such that subsequent download of the determined bit-rate variant of the secondary content by the media device results in a zero buffer experience at the media device, wherein to determine the bit-rate variant of the secondary content among the plurality of bit-rate variants of the secondary content to download, the crowdsource server accesses records of prior downloads of the secondary content by a plurality of media devices, wherein the records were provided to the crowdsource server by the plurality of media devices in a crowdsourced manner, identifies a subset of the records of the prior downloads of the secondary content by the plurality of media devices that are relevant to the media device based on the request from the media device, and generates a recommendation for the bit-rate variant of the secondary content among the plurality of bit-rate variants of the secondary content at a server among a plurality of servers to download by the media device based on the subset of the records;
receive information from the crowdsource server that identifies the determined bit-rate variant of the secondary content;
download the determined bit-rate variant of the secondary content from the server; and
stitch the downloaded bit-rate variant of the secondary content into the display of the primary content.

17. The media device of claim 16, wherein the at least one processor is further configured to:
transfer to the crowdsource server information relating to the download of the determined bit-rate variant of the secondary content, wherein the information comprises at least one of:
information identifying an internet service provider used for the download;
a geographical location of the media device;
the secondary content and the determined bit-rate variant of the secondary content;
a content server and content delivery network that the determined bit-rate variant of the secondary content was downloaded from;
performance characteristics of the download;
performance characteristics of a WIFI local to the media device; and
an amount of buffering at the media device caused by or related to the download.

18. The media device of claim 16, wherein the at least one processor is further configured to:
transmit a blacklist related query to the crowdsource server, wherein the query includes information identifying a type and capabilities of a combination of the media device, the display device and a network, wherein the crowdsource server accesses a blacklist corresponding to the combination, to determine whether the combination is capable of downloading and playing the secondary content, and wherein the secondary content is not played on the display device if the secondary content is on the blacklist.

* * * * *